US006970182B1

(12) United States Patent
Schultz et al.

(10) Patent No.: US 6,970,182 B1
(45) Date of Patent: Nov. 29, 2005

(54) IMAGE ACQUISITION SYSTEM AND METHOD FOR ACQUIRING VARIABLE SIZED OBJECTS

(75) Inventors: Kevin L. Schultz, Georgetown, TX (US); B. Keith Odom, Georgetown, TX (US); Charles Schroeder, Round Rock, TX (US); Mike Hall, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/421,963

(22) Filed: Oct. 20, 1999

(51) Int. Cl.$^7$ ................................................. H44N 9/47
(52) U.S. Cl. ..................................................... 348/86
(58) Field of Search ............................... 348/552, 553, 348/554, 42, 86; 356/237, 379; 382/8, 101, 382/162; 250/563, 222.1; 700/217; 209/580

(56) References Cited

U.S. PATENT DOCUMENTS

| | | | | |
|---|---|---|---|---|
| 4,760,270 A | * | 7/1988 | Miller | 250/563 |
| 4,772,555 A | * | 9/1988 | De Boer | 435/69.1 |
| 4,972,494 A | * | 11/1990 | White et al. | 382/8 |
| 5,339,607 A | * | 8/1994 | Regier | 53/501 |
| 5,497,314 A | * | 3/1996 | Novak | 705/17 |
| 5,515,159 A | * | 5/1996 | Sites et al. | 356/237.1 |
| 5,533,628 A | * | 7/1996 | Tao | 209/580 |
| 5,699,161 A | * | 12/1997 | Woodworth | 356/628 |
| 5,903,341 A | * | 5/1999 | Perry et al. | 356/237 |
| 5,911,003 A | * | 6/1999 | Sones | 382/162 |
| 6,215,117 B1 | * | 4/2001 | Spatafora | 250/222.1 |
| 6,236,735 B1 | * | 5/2001 | Bjorner et al. | 382/101 |
| 6,484,066 B1 | * | 11/2002 | Riess et al. | 700/217 |

* cited by examiner

Primary Examiner—Tung Vo
(74) Attorney, Agent, or Firm—Meyertons Hood Kivlin Kowert & Goetzel, P.C.; Jeffrey C. Hood; Mark K. Brightwell

(57) ABSTRACT

A system and method for acquiring images of variably sized objects. An object detector provides an indication of the presence or absence of objects as they pass by. An image sensing device acquires image data for the objects. An image acquisition device starts an activity counter, and initiates storage of image data for an object in response to detecting presence of the object. The image data is stored into an on-board memory. The activity counter counts a number of acquired scan lines for the object. In response to detecting absence of the object, the image acquisition device terminates the activity counter, and discontinues storage of the image data for the object. The final activity counter value, which reflects the number of scan lines acquired for the object, is recorded in an on-board FIFO. The image data is transferred to a system memory image buffer in a system memory. Host software routines may read the on-board FIFO. The image acquisition device is configured to rearm for acquisition of another object by resetting the activity counter, and initializing a write pointer to the on-board memory so that it points to the top of a next on-board memory buffer. After rearming, the image acquisition device may acquire image data for a second object in response to detecting presence of the second object.

7 Claims, 10 Drawing Sheets

IMAGE ACQUISITION SYSTEM AND METHOD FOR ACQUIRING VARIABLE SIZED OBJECTS

FIELD OF THE INVENTION

The present invention relates to the field of image acquisition, and in particular to a system and method for acquiring images of objects with varying sizes.

DESCRIPTION OF THE RELATED ART

In recent years, microprocessor-based computer systems such as personal computers have attained the power to support real-time image acquisition and image processing applications. FIG. 1 illustrates one such system. A host computer system HCS receives a video signal from a line scan camera LSC and an object detection signal from an object presence detector OPD. The line scan camera LSC is focussed on a conveyor. The conveyor carries a stream of objects such as OBJ#0, OBJ#1, OBJ#2. The objects may be of variable size (or height) with respect to the direction of conveyor motion. If the conveyor speed is constant, the height of an object corresponds to the duration of time it spends in contact with the detection plane DP or scanning plane SP. The line scan camera LSC acquires a series of scan lines as objects pass underneath. The line scan camera includes a single line of detecting elements instead of a rectangular array of detecting elements that is typical of other types of cameras. The line of detecting elements along with the camera optics define a scanning plane SP.

The object presence detector OPD provides to the host computer system HCS an indication of the instantaneous presence or absence of an object in its field of view. For example, the object presence detector OPD may detect objects based on a measurement of light transmission between two points on opposite sides of the conveyor belt. Various types of object detection technologies are known in the art and may be chosen to conform to the geometry and material properties of the objects being used. The object presence detector OPD defines some sort of detection surface which will be referred to herein as a detection plane DP. An object may be considered to be "present" when it intersects the detection plane, and "absent" when it does not.

FIG. 2 illustrates a typical organization for host computer system HCS. Host computer system includes a central processing unit (CPU), a bus bridge, system memory, an image acquisition (IMAQ) board, and a number of peripherals devices P1, P2, ..., Pn. Peripheral devices P1, P2, ..., Pn include devices such as memory media, modems, network adapters, graphics cards, sound boards, etc. The image acquisition device is responsible for acquiring scan line data into system memory. Software running on the CPU may process the acquired scan lines in real-time.

According to a first acquisition methodology, the image processing board may be programmed to continuously acquire scan lines into system memory, and leave the task of detecting object boundaries to the host software. However, this "continuous acquisition" strategy is memory intensive, and consumes CPU bandwidth to perform a low-level task (i.e. the object boundary detection). In addition, many image processing algorithms are not robust enough to handle the situation where the scan lines comprising a single object wrap from the bottom of one buffer to the top of another buffer.

According to a second acquisition methodology, the image processing board may continuously acquire scan lines into an on-board buffer, while a host software routine (running on the host CPU) polls an object detector (OPD) to detect presence and/or absence of objects. In response to detection of an object, the host software routine may initiate transfer of scan line data for the object to system memory. In response to detection of absence of the object, the host software may terminate the transfer of scan line data for the object. This second methodology may end up consuming less system memory than the first methodology above. However, host CPU bandwidth is wasted in performing low-level tasks (i.e. object polling and acquisition control). Also, because the object polling is performed in host software, the time between successive pollings may be large and non-deterministic. The actual times of object presence and absence may be known only crudely, and thus, it is possible to miss a portion of the object or to capture significantly more than the object. Also, the time required to rearm for acquisition of a second object after completion of a first object may be large due to the non-deterministic response time of the host software routine.

Because of these shortcomings, several modern image processing boards allow for triggered video acquisition, i.e. the initiation of scan line acquisition in response to a trigger signal. In this scenario, the image acquisition device waits in a quiescent state until a trigger signal is asserted. In response to the trigger signal, the image acquisition device acquires a fixed number of scan lines from the line scan camera LSC. The image acquisition device typically stores the acquired scan lines in an internal buffer prior to forwarding these scan lines to system memory. If the object presence signal OPS from the object presence detector OPD is provided to the image acquisition device as the trigger signal, the image acquisition device acquires a fixed number of scan lines in response to an object breaking the detection plane DP. The fixed number may be chosen based on the height of the largest possible object. For example, an analysis of the objects being used may reveal that the largest objects have a height no greater than 1000 scan lines. Thus, the fixed number may be set equal to 1000.

This strategy of acquiring a fixed number of lines in response to the initiation of object presence has its own disadvantages as shown in FIGS. 3A&3B. FIG. 3A illustrates the acquisition of 1000 scan lines from the line scan camera LSC in response to the leading edge LE0 of object OBJ#0 crossing the detection plane DP. It is noted that the line scan camera LSC may be located downstream from the detection plane DP, and thus, the image acquisition device may start acquiring the 1000 scan lines prior to the arrival of object OBJ#0 at the scanning plane SP. Thus, a margin of empty space preceding object OBJ#0 may be captured in the 1000 scan lines.

Unfortunately, because object OBJ#1 closely follows after object OBJ#0, the 1000 scan lines acquired by the image acquisition device includes all of object OBJ#0 and OBJ#1. After these 1000 scan lines are transferred to system memory, a host software algorithm must process the 1000 scan lines to detect the boundaries of object OBJ#0 and object OBJ#1 before any further image processing is applied to the individual objects.

In FIG. 3B, a first buffer B0 of 1000 scan lines is acquired in response to the leading edge LE0 of object OBJ#0. In FIG. 3B, object OBJ#1 follows the leading edge of object OBJ#0 with a distance D0 greater than 1000 lines. Thus, the image acquisition device captures only object OBJ#0 in the first buffer B0, and rearms for the arrival of the next object, i.e. OBJ#1. In response to the leading edge LE1 of object OBJ#1, the image acquisition device starts acquiring a second buffer B1 of 1000 scan lines. Because the leading edge LE2 of object OBJ#2 follows the leading edge of object OBJ#1 with a distance D1 smaller than 1000 lines, the image acquisition device captures all of OBJ#1 and a portion of object OBJ#2 in the second buffer B1.

It is noted that the image acquisition device typically initiates acquisition in response to leading edges of objects (i.e. transitions from "object absence" to "object presence"). After completing acquisition of the second buffer B1 at edge C1, the next object leading edge encountered by the image acquisition device is the leading edge LE3 of OJB#3. Thus, the trailing portion of object OBJ#2 will not be acquired by the image acquisition device. Missing portions of objects may have severely negative consequences.

One solution to the problems discussed in FIGS. 3A&3B is obtained by separating the leading edges of successive objects in the object stream by a distance greater than the buffer size of 1000 lines. In this case, each buffer of 1000 lines supplied to the host processing algorithm will contain a unique object. However, the host processing algorithm must still locate the trailing edge (and perhaps also the leading edge) of an object within the 1000 line buffer. Again, this decreases the available processing bandwidth for performing higher-level image processing algorithms on the object. In addition, any reliable mechanism for spacing the objects adds cost and complexity to the overall system.

Thus, there exists a substantial need for an image acquisition system and method which could (a) capture scan lines only during the presence of objects, (b) deliver scan lines to system memory with one object in each buffer, (c) report to host software the boundaries and/or length of the object within each buffer, and (d) quickly rearm for acquisition of second object after completion of a first object.

SUMMARY OF THE INVENTION

The present invention comprises an image acquisition system and method which acquires images of variably sized objects. The image acquisition system may comprise a host computer, an image acquisition device, an image sensing device (e.g. a line scan camera) and an object detector. The objects move relative to the image sensing device and object detector. For example, the objects may travel on a conveyor. The image sensing device generates image data (e.g. scan lines) for the objects as they move relative to the image sensing device. The object detector is configured to detect presence and absence of the objects as they move relative to the object detector. The image acquisition device couples to the image sensing device and the object detector, and includes an on-board memory.

In response to the object detector detecting presence of an object, the image acquisition device may initiate storage of image data corresponding to the object into the on-board memory. Furthermore, in response to the object detector detecting an absence of the object, the image acquisition device may discontinue storage of the image data corresponding to the object into the on-board memory. Thus, the image data stored into the on-board memory may efficiently capture the object itself.

The object detector may employ any of a variety of detection technologies. For example, the object detector may be based on the reflection and/or transmission of acoustic, light, or electromagnetic energy. The object detector may provide to the image acquisition device an object presence signal which indicates the instantaneous presence or absence of objects as they move into view of the object detector.

The image sensing device may free-run, i.e. may continuously generate image data. Alternatively, the image sensing device may be configured to generate image data only when enabled by the image acquisition device. The image acquisition device may enable the image sensing device only when objects are present. Thus, the image sensing device may operate more efficiently than in a free-running scenario.

In the preferred embodiment, the image acquisition device further comprises an activity counter for counting a number of scan lines corresponding to an acquired object. The image acquisition device is configured (a) to start the activity counter in response to the object detector detecting the presence of an object, and (b) to terminate the activity counter in response to the object detector detecting the absence of the object. The image acquisition device records the final value of the activity counter after the activity counter terminates. The image acquisition device may have an on-board FIFO buffer for storing the final activity count values.

The image acquisition device may be further configured to rearm itself for acquisition of a second object after the image acquisition device records the final value of the counter. Rearming may include resetting the activity counter, and initializing a pointer to point to the start of an available buffer in the on-board memory. The buffers of the on-board memory are also referred to herein as memory segments. After rearming, the image acquisition device may acquire more image data for the second object in response to the object detector detecting presence of the second object.

The image acquisition device may be connected to a host computer system which includes a CPU and a system memory. In order to facilitate the transfer of image data to system memory, the image acquisition device may include a first DMA controller. The first DMA controller may be responsible for transferring image data corresponding to acquired objects from the on-board memory to the system memory. The on-board memory may be partitioned into a plurality of on-board image buffers (also referred to herein as memory segments). The system memory may include a plurality of system memory image buffers which serve as targets for the DMA transfer of image data from the on-board memory.

The image acquisition device may initialize a write pointer to the start of a first on-board image buffer. In response to the object detector detecting presence of a first object, the image acquisition device may (1) initiate storage of image data (e.g. scan lines) for the first object into the first on-board image buffer and (2) initiate the activity counter. In response to the object detector detecting absence of the first object, the image acquisition device may (3) discontinue storage of the image data into the first on-board image buffer, and (4) terminate the activity counter. The image acquisition device may store the final activity counter value, which may reflect the number of scan lines acquired for the first object, into the on-board FIFO. The image acquisition device may then rearm for acquisition of another object. This may involve (5) initializing the write pointer so that it points to the start of a second on-board image buffer of the on-board memory, and (6) resetting the activity counter value. After rearming, the image acquisition device may (7) initiate storage of image data for a second object into the second on-board image buffer in response to the object detector detecting presence of the second object, (8) initiate the activity counter, and so on.

The image acquisition system may further comprise a memory controller which manages read and write accesses to the on-board memory. The memory controller maintains a write pointer and a read pointer. The write pointer points to a location in the on-board memory which is to be targeted by the next write access. The read pointer points to a location which is to source the next read access from the on-board memory. When the read pointer lags behind the write pointer, the memory controller may assert a signal to the first DMA controller requesting the first DMA controller to read image data from the on-board memory, and to transfer the image data to system memory. When the read pointer has caught up with the write pointer, due to the read activity of the first DMA controller, the memory controller may withdraw the request for read activity.

BRIEF DESCRIPTION OF THE DRAWINGS

A better understanding of the present invention can be obtained when the following detailed description of the preferred embodiment is considered in conjunction with the following drawings, in which.

Figure 1:
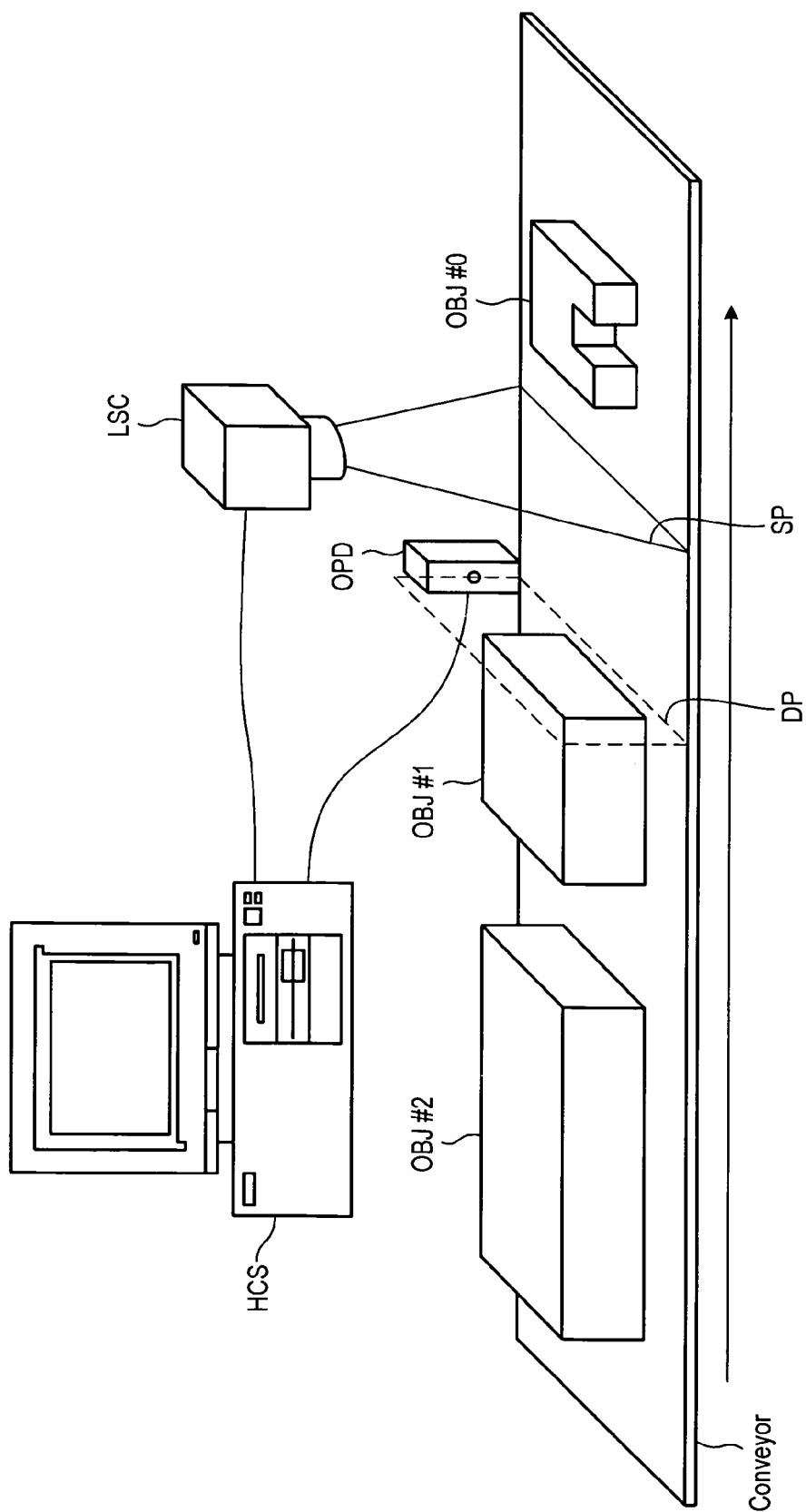
FIG. 1 illustrates an image acquisition system according to the prior art.
Figure 2:
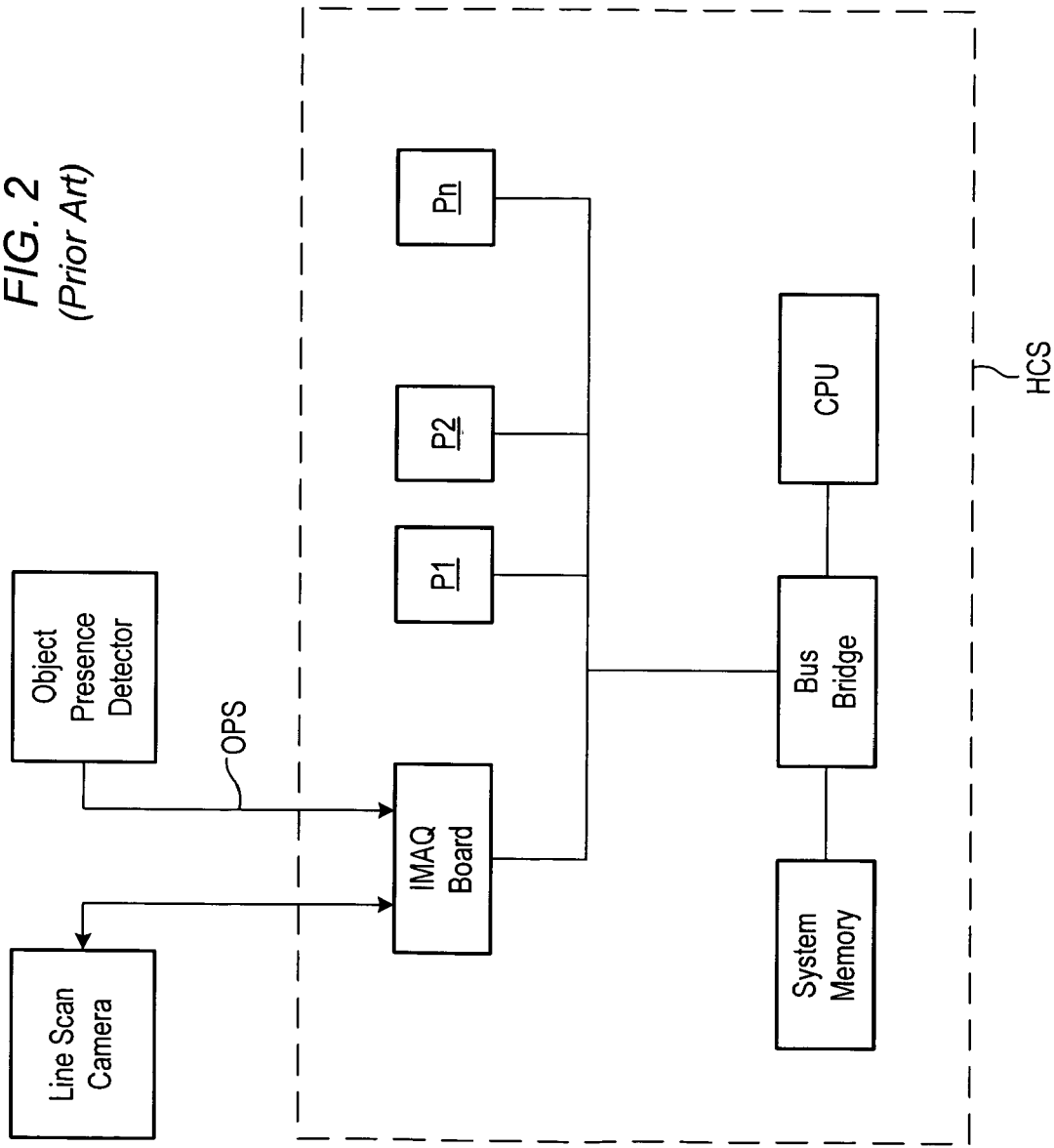
FIG. 2 illustrates a typical organization for a host computer system (HCS) in an image acquisition system according to the prior art.
Figure 3A:
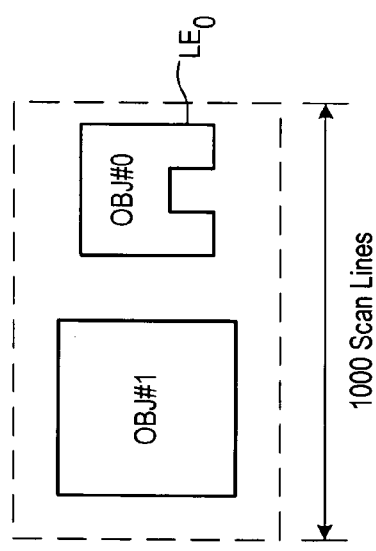
FIGS. 3A & 3B illustrate typical problems which arise in image acquisition.
Figure 3B:
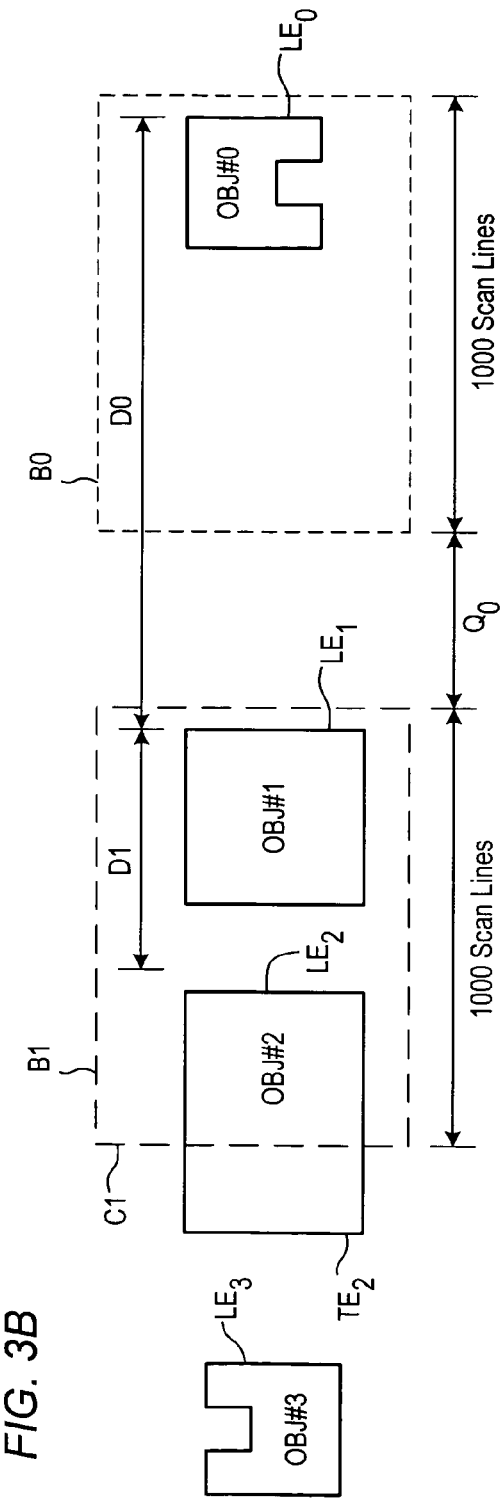

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
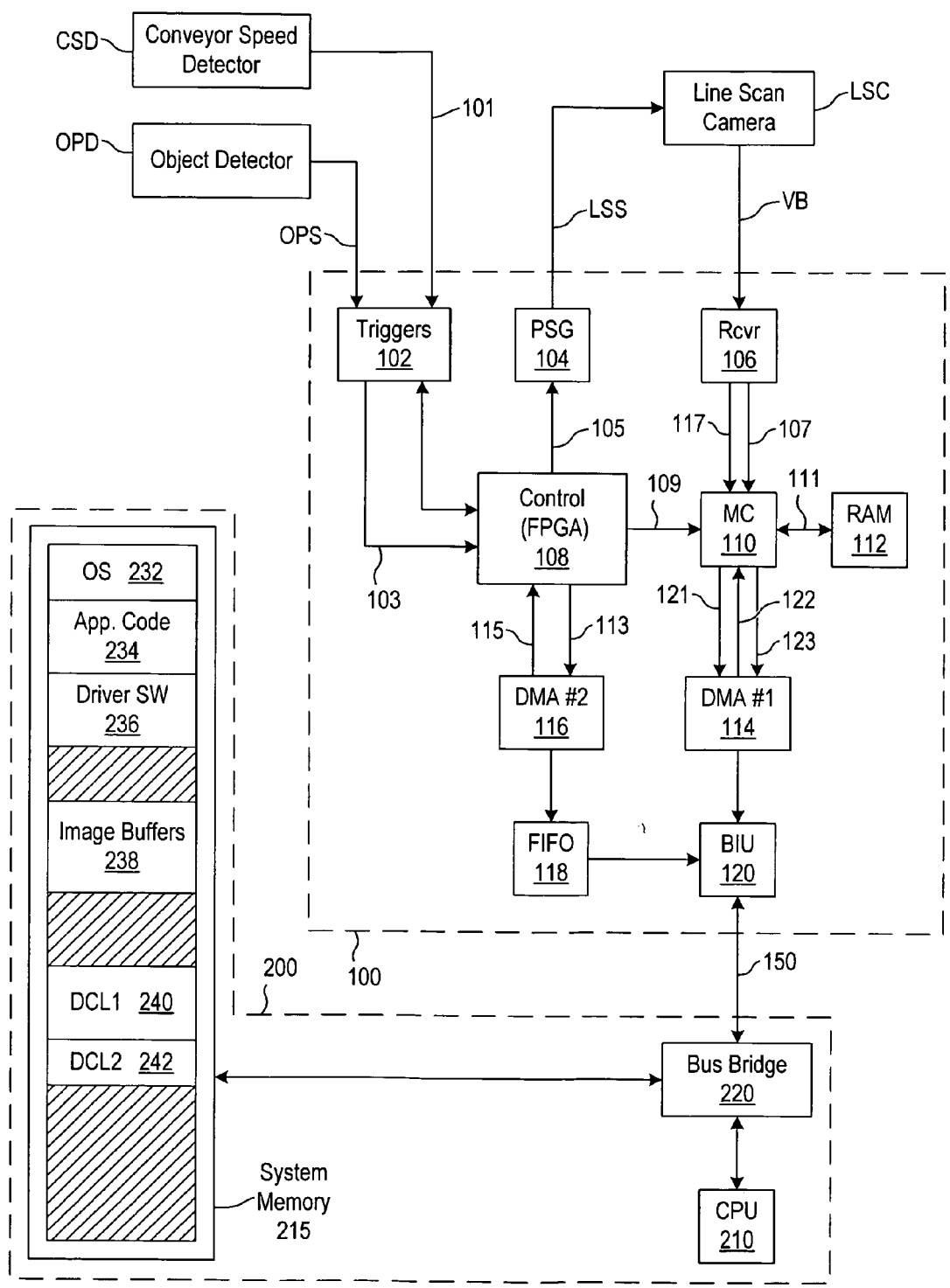
FIG. 4 is a system diagram for one embodiment of an image acquisition system according to the present invention.

FIG. 4—Video Acquisition System

FIG. 4 illustrates an image acquisition system according to the preferred embodiment of the present invention. The image acquisition system comprises image acquisition device 100 and host computer 200. Image acquisition device 100 is configured for coupling to host computer 200 through an interconnecting bus 150. The interconnecting bus 150 may be realized by any of a variety of connectivity technologies. In the preferred embodiment, the interconnecting bus 150 is a Peripheral Component Interconnect (PCI) bus. In the preferred embodiment, the image acquisition device 100 is an image acquisition board configured for insertion in a slot of host computer 200.

Image acquisition device 100 is also configured for coupling to line scan camera LSC and object presence detector OPD. Image acquisition device 100 may include a video input port (not shown) for coupling to video bus VB. In the preferred embodiment, line scan camera LSC provides a digital video signal to image acquisition device 100 through video bus VB. In addition, image acquisition device 100 drives a line sync signal LSS which controls line scan camera LSC. Object Presence Detector OPD provides object presence signal OPS to image acquisition device 100. Object presence signal OPS indicates the instantaneous presence or absence of an object with respect to detection plane DP (of FIG. 1).

In an alternative embodiment of the present invention, line scan camera LSC provides an analog video signal to the image acquisition device 100.

Host computer 200 is representative of any of a variety of computers. For example, host computer 200 may be a personal computer, a laptop, a portable computer, a workstation, etc. Host computer 200 comprises central processing unit (CPU) 210, system memory 215 and bus bridge 220. CPU 210 is configured to execute instructions stored in system memory 215. Bus bridge 220 is configured to mediate the exchange of data between system memory 215, CPU 210, and interconnecting bus 150.

System memory 215 stores operating system 232, application code 234, driver software 236, image buffers 238, first DMA Control List 240, and second DMA Control List 242.

Operating system 232 is typical of any of a variety of conventional operating systems. Application code 234 comprises one or more image processing algorithms which operate on the scanned images stored in image buffers 238. Driver software 234 comprises a system of routines (with well defined software interfaces) that enable higher-level routines, e.g. the image processing algorithms, to access resources available in hardware such as image acquisition device 100. Image buffers 238 store scan line data received from image acquisition device 100 by direct memory access (DMA) transfer. First DMA Control List 240 directs the operation of first DMA controller 114, while second DMA Control List 242 directs the operation of second DMA controller 116.

Image acquisition device 100 comprises programmable trigger circuitry 102, programmable signal generator 104, video receiver 106, control logic 108, memory controller 110, Random Access Memory (RAM) 112, first DMA controller 114, second DMA controller 116, First-In First-Out (FIFO) buffer 118 and bus interface unit (BIU) 120. Image acquisition device 100 is responsible for acquiring scan lines from line scan camera LSC and transferring the scan lines to image buffers 238 in system memory 215. Image acquisition device 100 controls line scan camera LSC through line sync signal LSS. In response to an assertion (e.g. a rising edge) of line sync signal LSS, line scan camera LSC may provide a digital stream corresponding to a single scan line on video bus VB.

Figure 5A:
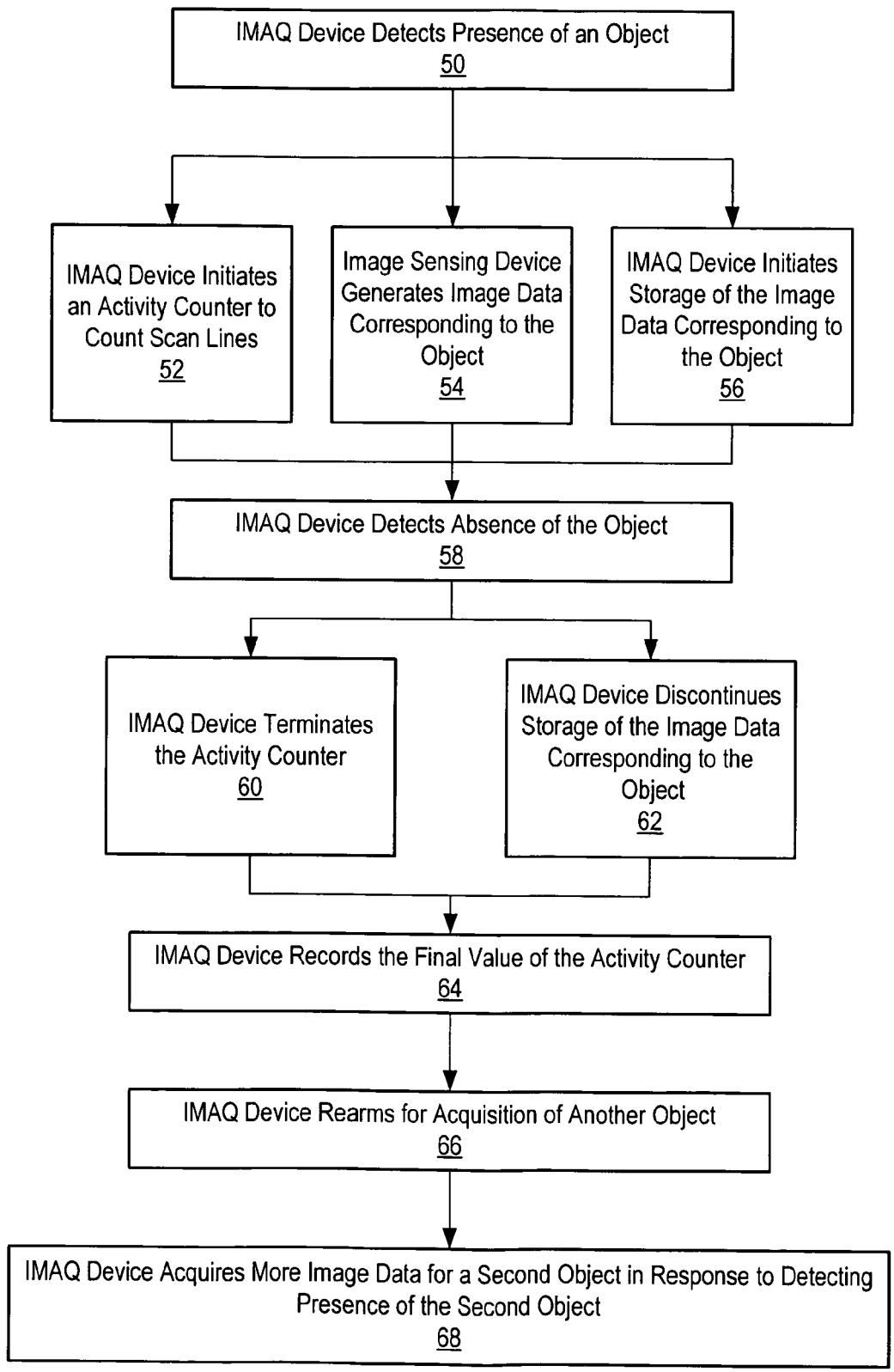
FIG. 5A is a flowchart for an image acquisition method according to the present invention.

FIG. 5A illustrates a method according to one embodiment of the present invention. In step 50, image acquisition device 100 detects the presence of an object. It is noted that image acquisition device 100 may be coupled to an object presence detector OPD. The object presence detector may provide to image acquisition device 100 an object presence signal OPS which indicates the instantaneous presence or absence of an object in its detection field.

In step 54, an image sensing device (e.g. line scan camera LSC) generates image data corresponding to the object. It is noted that the image sensing device may be configured to continuously acquire image data. Alternatively, the image sensing device may generate image data in response to the assertion of an enabling signal (e.g. a line sync signal) from the image acquisition device 100, and the image acquisition device 100 may assert the enabling signal in response to detecting presence of an object.

In step 56, the image acquisition device 100 initiates storage of the image data corresponding to the object in response to detecting presence of the object. In the embodiment of FIG. 4, trigger circuitry 102 asserts object indicator signal 103 in response to the assertion of the object presence signal OPS, and control logic 108 asserts a write enable signal on write enable line 109 in response to the object presence signal assertion. The write enable signal assertion initiates storage of image data for the current object into RAM 112.

In step 52, the image acquisition device 100 initiates an activity counter in response to detecting presence of the object. The activity counter counts a number of scan lines of image data acquired into on-board memory (i.e. RAM 112).

In step 58, the image acquisition device 100 detects absence of the object. In the preferred embodiment, the object presence signal OPS is deasserted (e.g. transitions from high to low) to indicate absence of the object. In step 62, the image acquisition device 100 discontinues storage of the image data corresponding to the object in response to detecting the absence of the object. In step 60, the image acquisition device 100 terminates the activity counter in response to detecting the absence of the object. Thus, the final value of the activity counter reflects the number of scan lines (of image data) corresponding to the object that were stored into on-board memory.

In step 64, the image acquisition device 100 records the final value of the activity counter, preferably in an on-board FIFO, after the activity counter has been terminated in step 60. Host software routines may then read the FIFO, and determine the size of an object without intensive software analysis.

In step 66, the image acquisition device 100 may rearm for acquisition of another object after recording the final value of the activity counter and after discontinuing storage of the image data corresponding to the object above. Rearming may include resetting the activity counter, and initializing a write pointer to the top of an available buffer in on-board memory. The term on-board refers to an entity which resides on the image acquisition device 100. An on-board memory buffer is said to be available after its contents have been copied to system memory. The action of storing new image data for a new object into the on-board memory buffer makes it unavailable. In step 68, the image acquisition device 100 acquires more image data for a second object in response to detecting a presence of the second object.

Figure 5B:
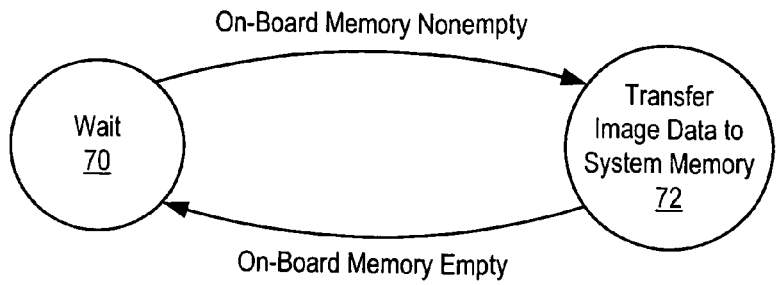
FIG. 5B is a state diagram which describes further features of the image acquisition method according to the present invention.

FIG. 5B is state diagram further describing the image acquisition method of present invention. In the preferred embodiment, the image acquisition device 100 includes a first DMA controller 114. In state 70, the first DMA controller 114 waits for the on-board memory (e.g. RAM 112) to become non-empty. In the embodiment of FIG. 4, the memory controller 110 maintains a read pointer and write pointer to RAM 112, and RAM 112 is said to be non-empty when the write pointer leads the read pointer. When the on-board memory becomes non-empty, the first DMA controller 114 moves to state 72, and transfers image data from the on-board memory to system memory 215, i.e. to system memory image buffers. When the on-board memory becomes empty, the first DMA controller 114 returns to wait state 70.

Programmable signal generator 104 may be programmed to assert the line sync signal LSS periodically when vertical enable signal 105 is asserted (e.g. high). Thus, line scan camera LSC may provide scan lines to receiver 106 on a periodic basis in time. Programmable signal generator 104 may maintain the line sync signal LSS in a deasserted (e.g. low) state when vertical enable signal 105 is deasserted (e.g. low). Programmable signal generator 104 may include an internal register whose value determines the period of the line sync assertion. The internal register may be written by host software, i.e. software routines running on CPU 210.

In an alternative embodiment, programmable signal generator 104 may be coupled to conveyor speed detector CSD. Conveyor speed detector CSD may be a quadrature encoder. The conveyor speed detector CSD may provide to the programmable signal generator 104 a conveyor speed signal. The conveyor may be configured with a series of markings, holes, indentations, spots, scorings, etc., which are equally spaced along the conveyor in the direction of conveyor motion. The conveyor speed detector CSD may assert a pulse of the conveyor speed signal for each one of the markings as they pass by a detection device. When the vertical enable signal 104 is in the asserted state (e.g. high), programmable signal generator 104 may assert the line sync signal LSS every X inches of conveyor motion based on the conveyor speed signal. Thus, if the conveyor's velocity changes in response to varying load (e.g. a heavy object being placed onto the conveyor), the image acquisition device 100 may advantageously acquire a constant number of video scan lines per inch of conveyor motion. Programmable signal generator 104 may maintain the line sync signal LSS in a deasserted (e.g. low) state when vertical enable signal 105 is deasserted (e.g. low).

Programmable signal generator 104 may count pulses of the conveyor speed signal to measure distance of conveyor motion. For example, if the conveyor has K markings per inch, then K*X pulses of the conveyor speed signal indicates that the conveyor has moved X inches. Programmable signal generator 104 may include an internal register whose value determines the spatial period X of the line sync assertion. This internal register may be written by host software, i.e. software routines running on CPU 210.

It is noted that the line sync signal LSS may be asserted in response any of a variety of trigger signals and/or signal conditions.

Figure 6:
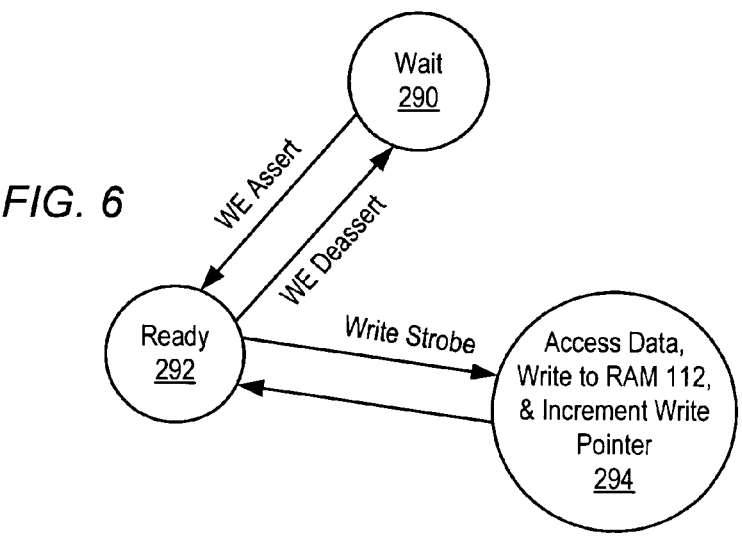
FIG. 6 is a state diagram for one embodiment of the write processing performed in hardware by memory controller 110 according to the present invention.

Receiver 106 serves as an interface between line scan camera LSC and write bus 107. Receiver 106 receives the digital scan line data supplied on video bus VB and forwards the digital scan line data onto write bus 107. Each scan line may be presented to write bus 107 as a stream of digital words (or doublewords, bytes, bits, etc.). Memory controller 110 selectively accesses scan line data from write bus 107 and writes the scan line data into RAM 112 depending on the state of write enable line 109 and write strobe line 107. In one embodiment, memory controller 110 may perform write accesses (into RAM 112) according to the state diagram of FIG. 6. Memory controller 110 may initially reside in wait state 290. In response to an assertion (e.g. low to high transition) of the write enable line 109, memory controller 110 may move to ready state 292. In ready state 292, memory controller 110 prepares to receive digital words from write bus 107. Receiver 106 may provide a signal on write strobe line 107 to indicate that a digital word is available on write bus 107. Thus, in response to an assertion of the write strobe signal, memory controller 110 may read a digital word from write bus 107, and store the digital word to a location in RAM 112 currently addressed by a write pointer. After performing the store to RAM 112, memory controller 110 may increment the write pointer so that it points to the next location in RAM 112 in preparation for the next write operation. After incrementing the write pointer, memory controller 110 may move ready state.

Receiver 106 may transfer a stream of digital words comprising one or more scan lines to memory controller 110 by repeatedly asserting the write strobe signal on write strobe line 117. In response to a deassertion of the write enable line 109, memory controller 110 may exit from ready state 292 and return to wait state 290.

Control logic 108 may couple to trigger circuitry 102 through an object indicator signal 103, to the second DMA controller 116 through a start enable line 115 and an acquisition done line 113, and to memory controller 110 through write enable line 109. Control logic 108 drives write enable line 109, and thereby, controls the acquisition of scan line data into RAM 112. In the preferred embodiment, control logic 108 operates according to the state diagram shown in FIG. 7.

In a wait state 302, control logic 108 holds the write enable line 109 in a deasserted state, and therefore, no scan line data is acquired into RAM 112 during wait state 302. Furthermore, in wait state 302, control logic 108 may also hold vertical enable signal 105 in a deasserted state. In response to an assertion (e.g. rising edge) of start enable signal 115, control logic 108 may move to ready state 304. In ready state 304, control logic 108 may still hold the write enable line 109 in a deasserted state, and the vertical enable signal 105 in a deasserted state.

It is noted that the start enable signal is controlled by second DMA controller 116. In one embodiment, second DMA controller 116 may write a predefined integer value to a start enable register in control logic 108 in order to assert the start enable signal.

From the ready state 304, control logic 108 may move to acquire state 306 in response to an assertion (e.g. rising edge) of the object indicator signal 103. In the acquire state 306, control logic 108 may assert (i.e. drive high) the write enable line 108, and thus, enable acquisition of scan line data into RAM 112. Also, in the acquire state 306, control logic 108 may assert the vertical enable signal 105. In response to a deassertion (e.g. falling edge) of the object indicator signal 103, control logic 108 may move to acquisition done state 307. In acquisition done state, control logic 108 may (a) drive the write enable line 108 to the deasserted state;
(b) drive the vertical enable line 105 to the deasserted state; and
(c) send an acquisition done signal to the second DMA controller 116 through acquisition done line 113.

After sending the acquisition done signal, control logic 108 may move to wait state 302.

Trigger circuitry 102 may receive object presence signal OPS and conveyor signal 101 from object detector OPD and conveyor speed detector CSD respectively. Object detector OPD asserts (e.g. drives low) the object presence signal OPS when the leading edge of an object breaks the detection plane DP. The object presence signal may stay asserted as long as the object intersects the detection plane DP. Thus, the deassertion (e.g. low to high transition) of the object presence signal indicates the trailing edge of the object.

Figure 8:
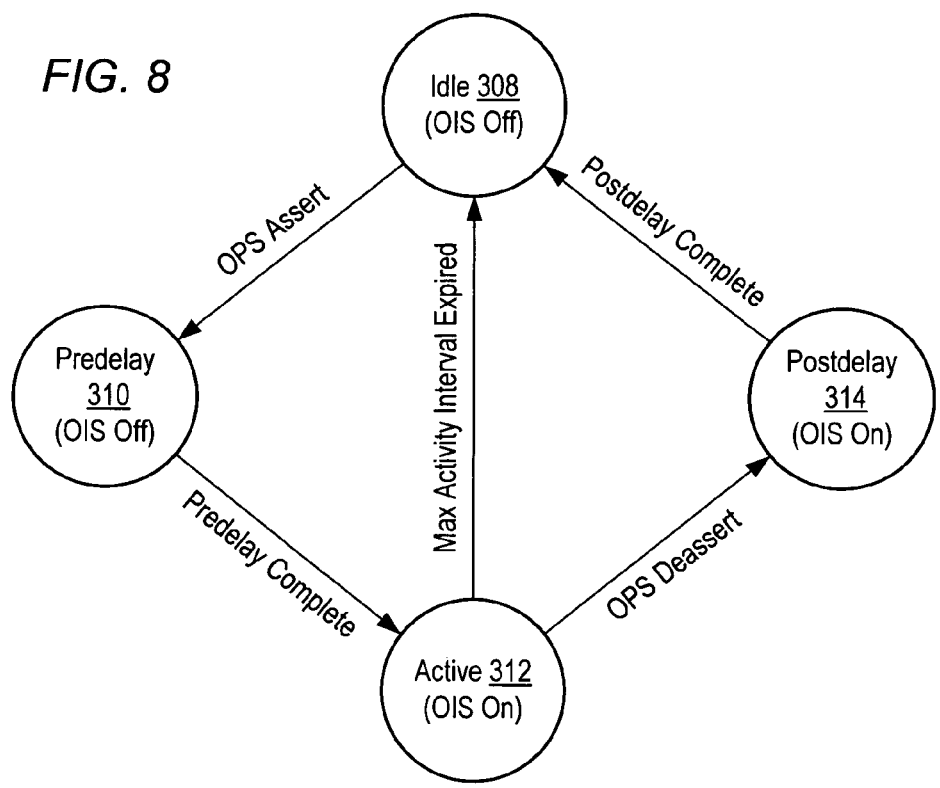
FIG. 8 is a state diagram for one embodiment of trigger circuitry 102 according to the present invention.

In one embodiment, trigger circuitry 102 may operate according to the state diagram given in FIG. 8. In idle state 308, trigger circuitry 102 holds the object indicator signal 103 in a deasserted state. In response to an assertion of the object presence signal, trigger circuitry 102 may move into predelay state 310. Predelay state 310 may be used to insert a programmable delay between the assertion of object presence signal OPS and the assertion of object indicator signal 103. This may advantageously allow the leading edge of an object to move from the detection plane DP into position below the line scan camera before enabling video line acquisition with the object indicator signal 103. Thus, upon entering predelay state 310, trigger circuitry 102 may initiate a predelay counter. The predelay counter may count an interval in time or a physical distance of conveyor displacement. It is noted that the conveyor signal 101 may provide an indication of the speed of the conveyor in which case conveyor displacement may be measured by integrating the conveyor signal 101. When the predelay count is complete, trigger circuitry 102 may move to active state 312. The duration/length of the predelay may be determined by a start count register in trigger circuitry 102. The start count register may addressed (i.e. written) by host software.

In active state 312, trigger circuitry 102 holds the object indicator signal 103 in an asserted state. Upon entering active state 312, trigger circuitry 102 may start an activity counter. The activity counter may be used to impose a maximum time interval for trigger circuitry 102 to reside in the active state 312. For example, the activity counter may count down starting from a initial value. When the activity counter reaches zero, indicating an expiration of the maximum time interval, trigger circuitry 102 may move to idle state 308. Recall that the object indicator signal 103 is deasserted (i.e. turned off) in the idle state 308. Thus, the activity counter may impose a maximum amount of time the object indicator signal 103 may be asserted. This advantageously limits the amount of scan line data that may be acquired for a single object. The initial value of the activity counter may be stored in a first initial value register. The first initial value register may written by host software.

In addition, trigger circuitry 102 may move from active state 312 to postdelay state 314 in response to a deassertion of the object presence signal OPS. The activity counter may continue counting when trigger circuitry 102 moves to postdelay state 314.

In postdelay state 314, trigger circuitry 102 may hold the object indicator signal 103 in the asserted state. In one embodiment, postdelay state 314 may be used to delay the deassertion of the object indicator signal 103 until a predetermined amount of time (or conveyor displacement distance) after the deassertion of the object presence signal OPS. This may advantageously allow control logic 108 to shut off scan line acquisition (into RAM 112) only after the trailing edge of an object has passed under line scan camera LSC. Thus, upon entering postdelay state 314, trigger circuitry 102 may start a postdelay counter whose value decrements towards zero. When the postdelay counter value reaches zero, trigger circuitry 102 may move to idle state 308. Recall that the object indicator signal 103 is deasserted (i.e. shut off) in idle state 308.

The activity counter may be turned off when trigger circuitry 102 exits postdelay state 314. Thus, the final value of the activity counter may indicate the total time duration that object indicator signal 103 remained in the asserted state, and thus, may offer a measure of the number of the scan lines acquired for the most recent object. Other agents such as the second DMA controller 116 may read the final activity counter value, and store this final value for reporting to host software (e.g. to a user algorithm).

The initial value of the postdelay counter controls the time duration (or conveyor displacement distance) of postdelay state 314. This initial value is determined by a second initial value register. The second initial value register may be written to by host software. It is noted trigger circuitry 102 may use conveyor signal 101 to measure conveyor displacement.

It is noted that the initial value of the predelay counter may be set to zero. Thus, object indicator signal 103 may be asserted as soon as the object presence signal OPS is asserted. Similarly, the initial value of the postdelay counter may be set to zero.

Figure 9:
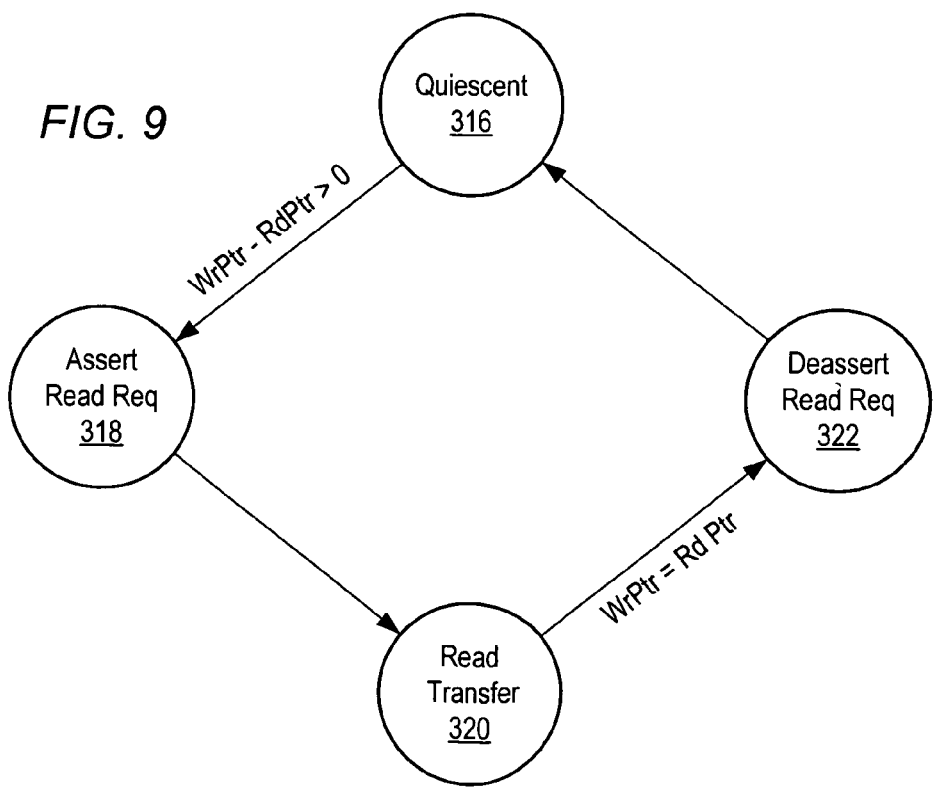
FIG. 9 is a state diagram for one embodiment of the read processing performed in hardware by memory controller 110 according to the present invention.

Memory controller 110 controls read accesses as well as write accesses to RAM 112. The control strategy employed by memory controller 110 imposes a FIFO (first-in first-out) organization to RAM 112. Memory controller 110 may control read accesses from RAM 112 according to the state diagram of FIG. 9. It is noted that memory controller 110 may perform the write processing associated with FIG. 6 in parallel with the read processing associated with FIG. 9.

In quiescent state 316, memory controller 110 does not perform read accesses from RAM 112. Recall that memory controller 110 maintains a write pointer into RAM 112. The write pointer indicates a location in RAM 112 which is to be targeted by the next write access into RAM 112. Memory controller 110 also maintains a read pointer. The read pointer indicates a location in RAM 112 which is to source the next read access from RAM 112. The write pointer may lead the read pointer by zero or more memory locations. The write pointer advances in response to write activity (where memory controller 110 accesses digital words from write bus 117 and writes them into RAM 112).

In response to the write pointer leading the read pointer, i.e. WrPtr−RdPtr>0, memory controller 110 may move to state 318. In state 318, memory controller 110 asserts a read request signal on read request line 121. The read request signal informs the first DMA controller 114 that RAM 112 contains data which needs to be transferred to system memory 215 (i.e. to image buffers 238). After asserting the read request signal, memory controller 110 may move to read transfer state 320. Memory controller 110 may maintain the assertion of the read request signal as long as the write pointer leads the read pointer.

In read transfer state 320, memory controller 110 reads digital words from RAM 112 in response to address/control signals provided by first DMA controller 114 on address/control bus 122. Memory controller 110 provides the digital words to first DMA controller 114 via read data bus 123. Memory controller 110 may increment the read pointer for each digital word read from RAM 112. When the read pointer catches up with the write pointer, i.e. when the condition WrPtr=RdPtr becomes true, memory controller 110 may move to state 322.

It is noted that the memory controller 110 imposes a FIFO structure on RAM 112. Memory locations in RAM 112 in the range of addresses between RdPtr inclusive and WrPtr exclusive may be interpreted as the current contents of the FIFO structure. Thus, when the read pointer equals the write pointer, the FIFO structure may be considered to be empty.

In state 322, memory controller 110 may deassert the read request signal on read request line 121. The deassertion of the read request signal informs the first DMA controller 114 that RAM 112 is presently empty. After deasserting the read request signal, memory controller 110 may move to quiescent state 316.

Figure 11:
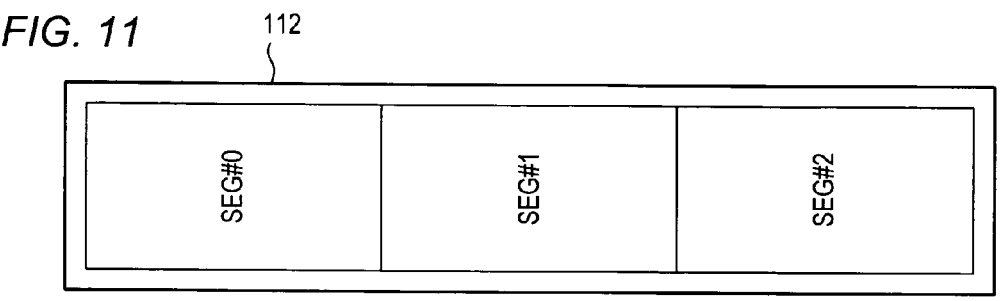
FIG. 11 illustrates an organization for random access memory 112 wherein RAM 112 is partitioned into a plurality of memory segments.

RAM 112 may comprise a set of memory segments as shown in FIG. 11. FIG. 11 illustrates RAM 112 as having three memory segments denoted SEG#0, SEG#1 and SEG#2. However, it is noted that RAM 112 may have any number of memory segments subject to fundamental limitations such as cost, complexity, geographical space conservation, etc. Each memory segment is preferably large enough to hold a number of scan lines which corresponds to the maximum expected object size on the conveyor. For example, an analysis of the set of objects to be used in the operational context may reveal that objects are no larger than 1000 scan lines in height (i.e. the direction of the conveyor propagation). Thus, each of the memory segments may be configured with at least 1000 scan lines worth of storage.

Figure 7:
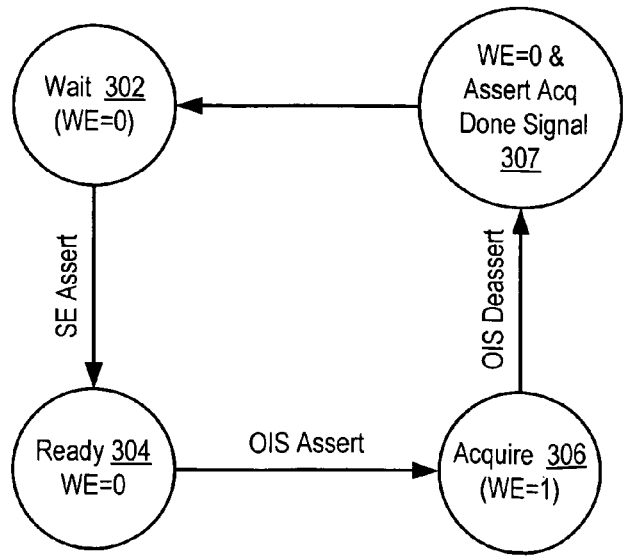
FIG. 7 is a state diagram for one embodiment of control logic 108 according to the present invention.

As alluded to above, when an object crosses detection plane DP, object presence detector OPD asserts (e.g. drives low) the object presence signal OPS. In response to the assertion of the object presence signal OPS, trigger circuitry 102 asserts (perhaps after a programmable delay) the object indicator signal 103. However, the assertion of object indicator signal 103 does not necessarily imply that scan line data for the object will be acquired into RAM 112. Recall, an assertion of write enable line 109 enables acquisition of scan line data into RAM 112. Control logic 108 responds to the assertion of the object indictor signal 103 with an assertion of the write enable line 109 only if the start enable signal 115 has been asserted by second DMA controller 116 prior to the assertion of the object indicator signal 103 as shown in FIG. 7. Thus, second DMA controller 116 controls the acquisition of scan line data for a next object by asserting or withholding the start enable signal 115.

In one embodiment, second DMA controller 116 is itself controlled by a data structure stored in system memory 215 and referred to herein as the second DMA control list 242. The second DMA control list 242 comprises a plurality of linked command structures called Nodes. A Node comprises a TransferCount field, a TransferAddress field, and a NextPtr field as illustrated in the following code fragment:

```
typedef  {   uInt32   TransferCount;
             uInt32   TransferAddress;
             uInt32   NextPtr;
         }   Node;
``` where uIntN denotes an unsigned N-bit integer data type. It is noted that the 32-bit size of the fields given above is illustrative. Other embodiments are contemplated where the fields have different sizes (or combinations of sizes). A Node may be interpreted in several different ways depending on the value of the TransferCount field. However in most cases, the TransferAddress and NextPtr field contain physical addresses defining locations in system memory 206. The NextPtr field is used to point to the next Node of the second DMA Control List 242.

If the TransferCount field takes a value in the range 0x1 through 0xFFFFFFFE, the Node may be interpreted as a DMA transfer command. In this case, the second DMA controller 116 reads exactly TransferCount locations from RAM 112 and transfers the resulting data to a destination in system memory 206 given by TransferAddress. Upon completion of the DMA operation, the second DMA controller 116 accesses the next node of the second DMA Control List using the NextPtr.

If the TransferCount field takes the value 0x0, the second DMA Controller 116 terminates processing. Thus, in this case the Node is interpreted as a STOP command.

If the TransferCount field takes the value 0xFFFFFFFF, the second DMA Controller 116 accesses an associated list located in system memory 215 at the address given by TransferAddress. The associated list contains a sequence of register transfer descriptors concluded by a termination marker (0xFFFFFFFF). Each register transfer descriptor specifies a read access or a write access from/to one of the internal registers of the image acquisition device 100. In the case of a write access, the register transfer descriptor may specify the data value which is to be written to the selected internal register. In the case of a read access, the data contents of the selected internal register may be transferred to FIFO 118 or an accumulator register in the second DMA controller 116. The second DMA Controller 116 steps through the sequence of register transfer descriptors performing the indicated read or write operations. When the termination marker (0xFFFFFFFF) is reached, the second DMA Controller 116 uses the NextPtr to access the next Node of the second DMA Control List 242.

Thus, the Nodes of the second DMA Control List 242 may have several different interpretations depending on the value of the TransferCount field. The Transfer Nodes define a DMA transfer operation to system memory 215. The STOP Nodes cause the second DMA Controller 116 to terminate processing. The Special Nodes with TransferCount field equal to 0xFFFFFFFF allow an arbitrary sequence of register reads and/or writes to be performed, and thus are of exceptional utility and flexibility.

Figure 10:
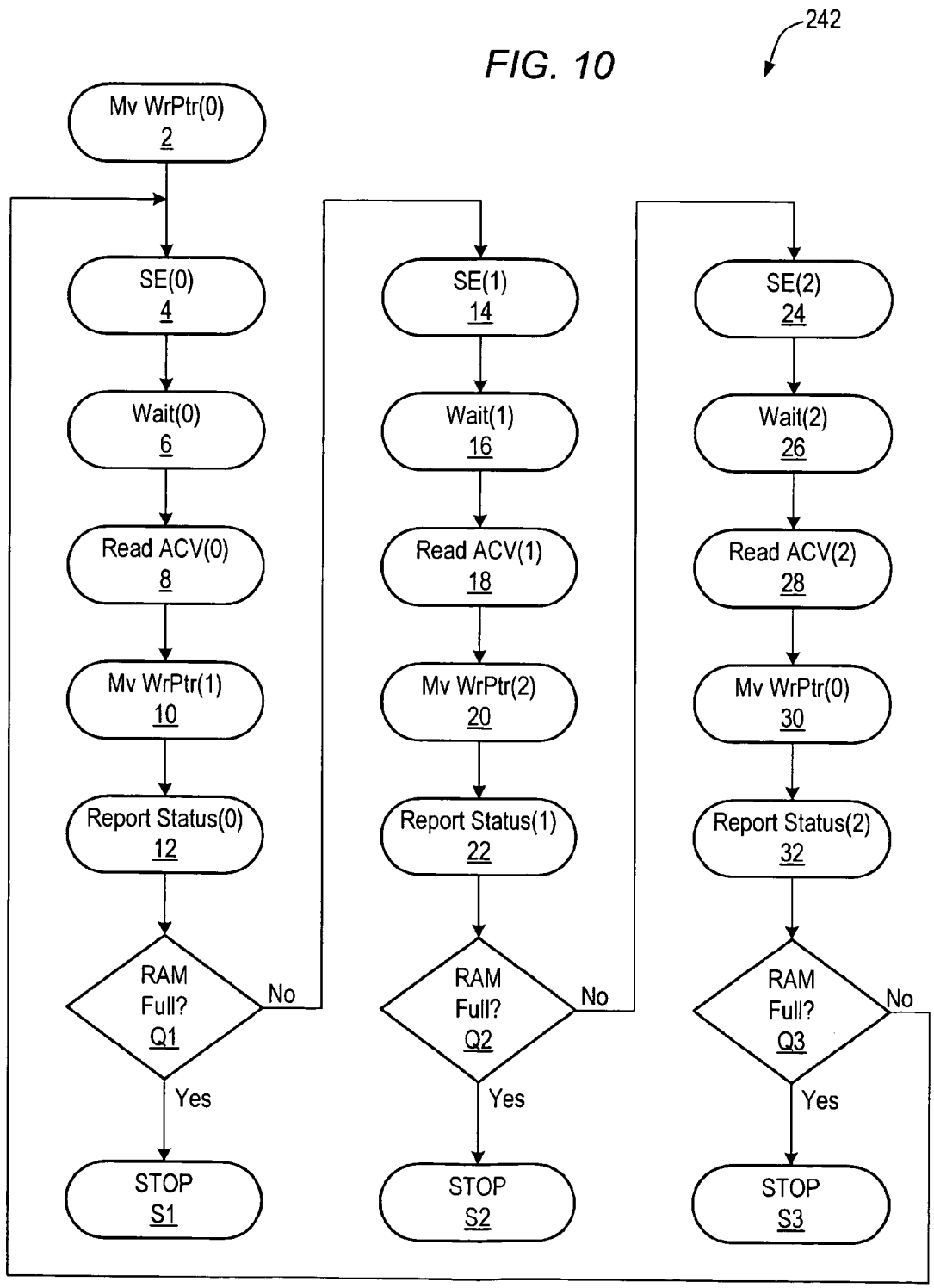
FIG. 10 illustrates a data structure (referred to herein as the second DMA control list 242) according to the present invention, which controls operation of second DMA controller 116.

FIG. 10 illustrates one possible structure for the second DMA control list 242 in the situation where RAM 112 is partitioned into three memory segments as shown in FIG. 11. In the embodiment shown in FIG. 10, the second DMA control list 242 includes a plurality of Special Nodes 2–32 and STOP Nodes S1, S2 and S3.

The Special Nodes 2, 10, 20 and 30 instruct the second DMA controller 116 to write predefined values to a write pointer register in memory controller 110. The write pointer register defines the value of the write pointer discussed above. Special Node 2, denoted "Mv WrPtr(0)" sets the write pointer so that it points to the top of the first memory segment, i.e. SEG#0 in the notation of FIG. 11. More generally, the Special Node denoted "Mv WrPtr(k)" sets the write pointer so that it points to the top of the memory segment SEG#k. These Special Nodes 2, 10, 20 and 30 are responsible for ensuring that scan line data for a single object is written into each memory segment, and that the scan line data for an object is aligned with the beginning of a memory segment. For example, after scan lines for a first object have been stored into memory segment SEG#1, Special Node 20 sets the write pointer of memory controller 110 so it points to the top of memory segment SEG#2. Thus, scan line data for the next object to cross the detection plane DP will be written into memory segment SEG#2.

Each of Special Nodes 4, 14 and 24 instruct the second DMA controller 116 to write a predetermined integer value to a start enable register in control logic 108. The action of writing the start enable value to the start enable register comprises the start enable signal 115 described above. Recall that the start enable signal 115 enables control logic 108 to acquire the next object into RAM 112.

Each of Special Nodes 6, 16 and 26 instruct the second DMA controller 116 to wait for the acquisition done signal 113 from control logic 108. Recall that control logic 108 asserts the acquisition done signal 113 after completing scan line acquisition for an object, i.e. after deasserting write enable line 109. In one embodiment, the Special Node "Wait(k)" instructs the second DMA controller 116 to perform a one byte transfer to a register in control logic 108. The one byte transfer completes only after control logic 108 has deasserted write enable line 109.

Each of Special Nodes 8, 18 and 28 instruct the second DMA controller 116 to (a) read the final activity count value from an activity counter register in trigger circuitry 102 and (b) write the final activity count value to FIFO 118. The final activity count value provides a measurement of the time duration (or number of scan lines) stored for the most recently acquired object. Host software may read FIFO 118 to obtain the activity count values corresponding to specific objects.

Each of Special Nodes 12, 22 and 32 instruct the second DMA controller 116 to interrupt CPU 210. This interrupt serves to report to host software that an object has been successfully acquired to a buffer in RAM 112.

STOP Nodes S1, S2 and S3 instruct the second DMA controller 116 to terminate processing.

Conditional branches Q1, Q2 and Q3 indicate that image data acquisition continues as long as RAM 112 is not full. RAM 112 is said to be full when all of the memory segments in RAM 112 contain image data which is awaiting transfer to system memory 215. When the image data contents of a memory segment are transferred to system memory, the memory segment is said to be available for reception of new image data.

Conditional branches Q1, Q2 and Q3 may be implemented by host software. For example, host software may initially configure the second DMA control list 242 so that (a) the NextPtr fields of Special Nodes 12 and 22 point to Special Nodes 14 and 24 respectively, and (b) the NextPtr field of Special Node 32 points to Stop Node S3. In response to the first DMA controller 114 completing a transfer of image data from memory segment SEG#k to system memory 215, host software may (a) reassign the NextPtr field of Special Node "Report Status(k-1)" so that it points to Special Node SE(k), and (b) reassign the NextPtr field of Special Node "Report Status (k)" so that it points to a Stop Node.

In an alternative embodiment, conditional branches Q1, Q2 and Q3 may be implemented by the first DMA controller 114.

Special Node 2 initializes the write pointer to the start of memory segment SEG#0. Special Node 4, denoted "SE(0)", sends the start enable signal 115 to control logic 108. In response to this start enable signal, control logic 108 will wait until the arrival of an object as indicated by an assertion (e.g. rising edge) of object indicator signal 103. In response to the object indictor signal assertion, control logic 108 will assert the write enable line 109, and thus, command memory controller 110 to acquire scan lines for the object. The scan lines for this object will be stored into memory segment SEG#0 due to the write pointer initialization of Special Node 2.

Special Node 6, denoted "Wait(0)", forces the second DMA controller 116 to wait until control logic 108 has completed acquisition of scan lines for an object into memory segment SEG#0. Special Node 8, denoted "Read ACV(0)", instructs the second DMA controller 116 to read the final activity counter value, which reflects the number of scan lines stored into memory segment SEG#0 for the recently acquired object. Furthermore, the final activity counter value is stored into FIFO 118. It is noted that the Wait(0) Node 6 ensures that the final activity counter value is not read prematurely while scan line data is still being acquired to SEG#0.

Special Node 10 moves the write pointer to the top of memory segment SEG#1 in anticipation of the arrival of the another object. Special Node 12, denoted "Report Status(0)", reports to CPU 210, i.e. to host software running on CPU 210, that a complete object has been stored into a memory segment. Special Node 12 may implement the report to CPU by writing an integer value to an "interrupt CPU" register in control logic 108. The "interrupt CPU" register, when written to, issues an interrupt to CPU 210.

As indicated by conditional branch Q1, if RAM 112 is full, the second DMA controller 116 accesses Stop Node S1. The Stop Node S1 commands the second DMA controller 116 to terminate processing. If RAM 112 is not full, the second DMA controller 116 accesses Special Node 14.

Special Node 14, denoted "SE(1)", sends another start enable signal to control logic 108. This start enable signal enables acquisition of scan line data for the next object into RAM 112. Because of the write pointer assignment of Special Node 10, the scan line data for this next object will be written into memory segment SEG#1.

The remaining Nodes and conditional branches of the second DMA control list operate similarly to those just discussed.

Figure 12:
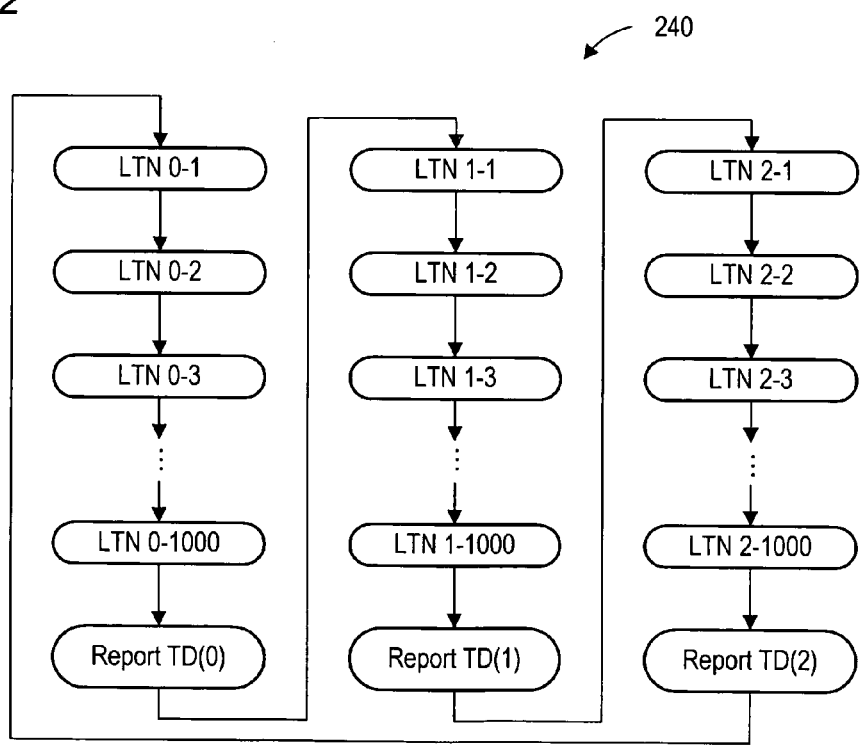
FIG. 12 illustrates another data structure (referred to herein as the first DMA control list 240) according to the present invention, which controls operation of first DMA controller 114.
Figure 13:
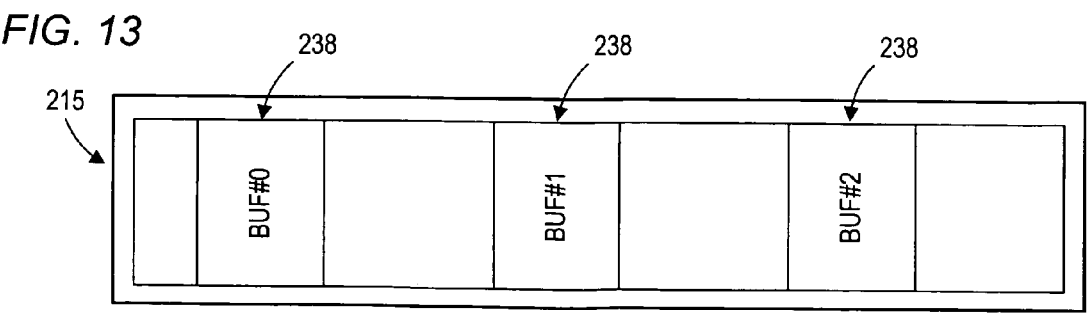
FIG. 13 illustrates a set of image buffers 238 located in system memory 215 which serve as targets for image data transfers by first DMA controller 114.

As mentioned above, the second DMA controller 116 is controlled by the second DMA control list 242. In a similar fashion, the first DMA controller 114 is controlled by a data structure referred to herein as the first DMA control list 240. The first DMA control list 240 may comprise a circularly linked list of command Nodes. FIG. 12 shows one possible structure for the first DMA control list 240 in the situation where image buffers 238 comprise three buffers as shown in FIG. 13. The three image buffers, denoted BUF#0, BUF#1 and BUF#2, serve as targets for scan line data transferred from memory segments in RAM 112 by the first DMA controller 112. It is noted that the number of memory segments in RAM 112 need not equal the number of image buffers 238.

The first DMA control list 240 comprises three sublists which correspond to the columns of FIG. 12. The sublists are in one-to-one correspondence with the image buffers BUF#0, BUF#1 and BUF#2. Each sublist programs the transfer of scan line data from one of the memory segments in RAM 112 to a corresponding image buffer BUF#k. The three sublists are circularly linked. This implies that the three image buffers are circularly overwritten in the order BUF#0, BUF#1, BUF#2, BUF#0, BUF#1, BUF#2, and so on.

Each sublist of the first DMA control list 240 comprises a plurality of line transfer nodes and a Special Node denoted "Report TD(k)". The line transfer node "LTN k-j" instructs the first DMA controller 114 to transfer a single line of video data from RAM 112 to image buffer BUF#k. In the present example, the memory segments are configured to store 1000 scan lines. Thus, each sublist comprises 1000 line transfer nodes, i.e. LTN k-1 through LTN k-1000. After these 1000 line transfer nodes have been executed, the contents of a memory segment will have been completely transferred to image buffer BUF#k.

The Special Node "Report TD(k)" writes a completion marker (such as 0xFF) to FIFO 118 indicating that a memory segment has been completely transferred to one of image buffers 238. In addition, Special Node "Report TD(k)" writes an appropriate integer value to an "Interrupt CPU" register in control logic 108. When the "Interrupt CPU" register is written, control logic 108 may issue an interrupt to CPU 210. The CPU interrupt may invoke the execution of an interrupt service routine on CPU 210. The interrupt service routine may read FIFO 118. Based on the number of completion markers and the activity count values stored in FIFO 118, the interrupt service routine may easily derive the number of acquired scan lines for each object acquired into image buffers 238. The interrupt service routine may pass this information to an image processing algorithm which also runs on CPU 210. The image processing algorithm may thereby avoid the effort of determining the size and location of object within image buffers 238.

Figure 14A:
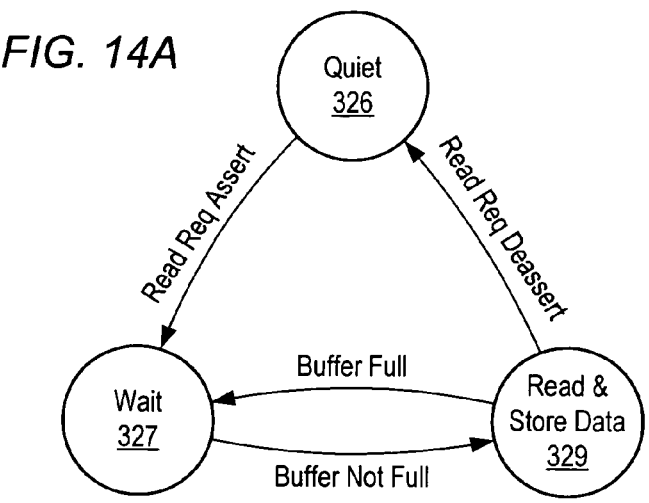
FIG. 14A is a state diagram for the receive processing performed by the first DMA controller 114 according to one embodiment of the present invention.

As noted above, the first DMA controller 114 receives image data from memory controller 110 and transfers the image data to system memory 215, i.e. to image buffers 238 in system memory. To facilitate the image data transfers, the first DMA controller 114 includes an internal buffer. FIG. 14A presents a state diagram for the receive processing performed by the first DMA controller 114 according to one embodiment of the present invention.

First DMA controller 114 may initially occupy quiet state 326. In response to an assertion of read request signal 121 by memory controller 110, the first DMA controller 114 may move to wait state 327. If the internal buffer is full, the first DMA controller 114 remains in wait state 327 until the internal buffer attains a non-full condition, and then, moves to state 329. If the internal buffer is not full, the first DMA controller 114 may move to state 329 immediately.

In state 329, the first DMA controller 114 asserts address/control signals on address/control bus 122, and thereby, directs memory controller 110 to read digital words from RAM 112. Memory controller 110 provides the digital words to first DMA controller 114 through read data bus 123. First DMA controller 114 stores the digital words in its internal buffer. First DMA controller 114 may continue to read digital words from RAM 112 until the internal buffer becomes full or until the real request signal 121 is deasserted.

If the internal buffer becomes full, the first DMA controller 114 may terminate reading of digital words from RAM 112, and may move to wait state 327.

If, during state 329, the read request signal 121 is deasserted, first DMA controller 114 may move to quiet state 326.

Figure 14B:
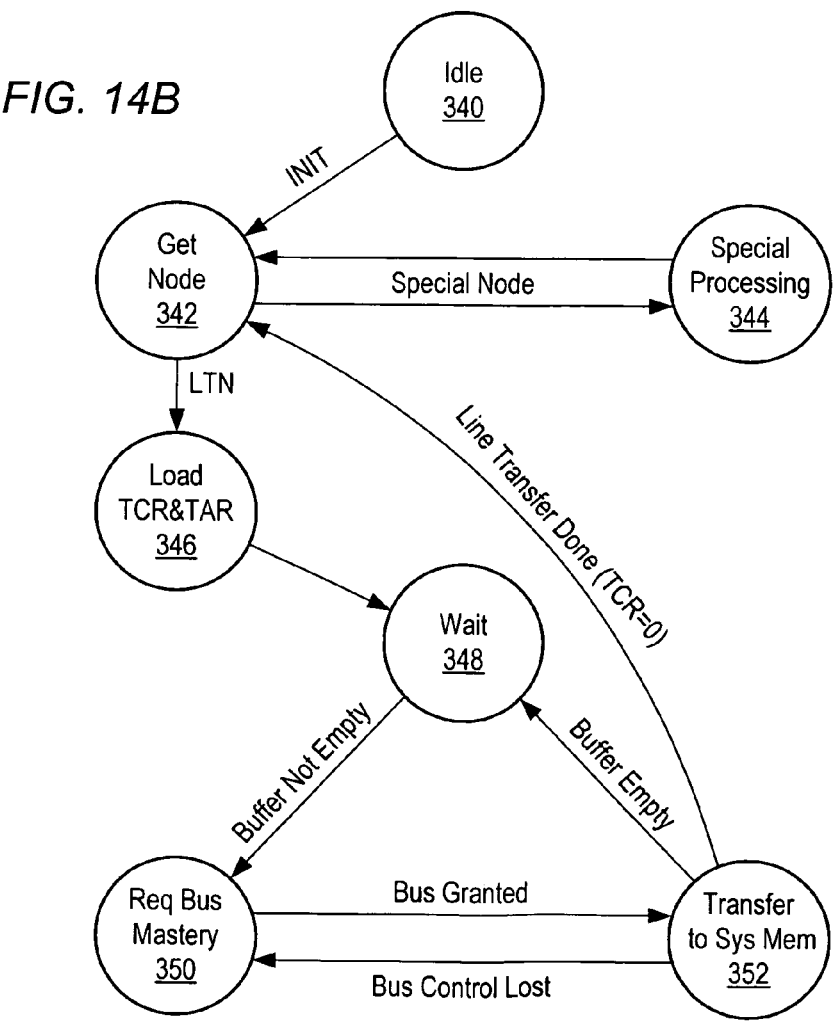
FIG. 14B is a state diagram for the transmit processing performed by the first DMA controller 114 according to one embodiment of the present invention.

FIG. 14B is a state diagram for the transmit processing performed by the first DMA controller 114 according to one embodiment of the present invention. The first DMA controller 114 may initially occupy idle state 340. Host software running on CPU 210 may send a signal, denoted "INIT", which initiates processing activity of first DMA controller 114. In response to the initiation signal, the first DMA controller 114 may move to state 342. In state 342, the first DMA controller 114 reads a node of the first DMA control list 240 from system memory 114.

It is noted that alternative embodiments are contemplated were the first DMA control list 240 and/or the second DMA control list 242 are stored on the image acquisition device 100.

The first DMA controller 114 examines the Transfer Count field of the command Node just obtained, and determines if the command Node is a line transfer node (LTN) or a Special Node (which programs an arbitrary series of register reads and/or writes). If the command Node is a Special Node, the first DMA controller 114 moves to state 344. In state 344, the first DMA controller 114 performs the series of reads and/or writes dictated by the Special Node. For example, as described above in connection with FIG. 12, the Special Node "Report TD(k)" directs the first DMA controller (a) to write a completion marker (e.g. 0xFF) to FIFO 118 indicating completion of a memory segment transfer to an image buffer, and (b) to write a register in control logic 108 which induces a CPU interrupt. After completing the series of read and/or writes indicated by the Special Node, the first DMA controller 114 returns to state 342, and thus, obtains the next Node from the first DMA control list 240. Recall that the NextPtr field of each Node points to the next Node in the first DMA control list 240.

In state 342, the first DMA controller 114 may determine that the Node just obtained is a line transfer node (LTN). In this case, the first DMA controller 114 moves to state 346. In state 346, the first DMA controller 114 writes a Transfer Count Register (TCR) with the value of the TransferCount field of the current line transfer node. In addition, the TransferAddress field is stored in a Target Address Register (TAR) of the first DMA controller 114. The TransferAddress field defines the target location in system memory 215 where the current line of scan line data is to be written. After completion of the processing associated with state 346, the first DMA controller 114 moves to wait state 348.

If the internal buffer is empty, the first DMA controller 114 remains in wait state 348. In response to the internal buffer becoming non-empty, the first DMA controller 114 moves to state 350. In state 350, the first DMA controller 114 sends a signal to bus interface unit 120 requesting mastery of interconnecting bus 150. In response to a signal from bus interface unit 120 indicating that bus mastery has been granted, the first DMA controller 114 moves to state 352.

In state 352, the first DMA controller 114 reads data words from the internal buffer and transfers the data words to system memory 215. The target address register defines the target location in system memory for the data transfer. The target address register may be incremented for each data word transferred. Furthermore, the transfer count register is decremented for each data word transferred. When the transfer count register reaches zero, the DMA transfer programmed by the current line transfer node (LTN) will have completed. Thus, in response to the transfer count register reaching zero, the first DMA controller 114 moves to state 342 to obtain the next node of the first DMA control list 240.

While transferring data to system memory 215 in state 352, the internal buffer may become empty. If the internal buffer becomes empty, the first DMA controller 114 may return to state 348 to wait for the internal buffer to become non-empty (due to the receive processing activity shown in FIG. 14A).

It is noted that the first DMA controller 114 may lose control of interconnecting bus 150 while in "data transfer" state 352. If the first DMA controller 114 loses control of the interconnecting bus 150, the first DMA controller 114 may return to state 350. Thus, the first DMA controller 114 again requests mastery of the interconnecting bus 150, and transfers more data when the mastery is granted. The first DMA controller 114 may cycle through states 350 and 352 repeatedly in order to transfer the current scan line to system memory 215.

From the discussion above, recall that the Special Node "Report TD(k)" induces a CPU interrupt and writes a completion marker (e.g. 0xFF) to FIFO 118 indicating that a memory segment SEG#k has been completely copied to image buffer BUF#k. Thus, after the execution of Special Node "Report TD(k)", memory segment SEG#k will be available for the acquisition of scan line data for a new object.

In addition, as described above, the Special Node "Report Status(k)" instructs the second DMA controller 116 (a) to write the final activity count value for an object to FIFO 118, and (b) to interrupt CPU 210. In response to this CPU interrupt, a second interrupt service routine may read FIFO 118.

In one embodiment of the present invention, the second interrupt service routine may read the activity count values and completion markers stored in FIFO 118, and thereby derive the size of objects stored in image buffers 238. The second interrupt service routine may pass this information to an image processing algorithm. The image processing algorithm may thereby avoid the effort of determining the size and location of objects within image buffers 238.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for acquiring images of variable sized objects in an image acquisition system, wherein the image acquisition system comprises an image sensing device and an image acquisition device, wherein the objects are moving relative to the image sensing device, wherein the method acquires images independent of spacing between the objects, the method comprising:
   (a) the image acquisition device physically detecting presence of a first object;
   (b) the image sensing device generating image data corresponding to the first object;
   (c) the image acquisition device initiating storage of the image data corresponding to the first object in response to the image acquisition device detecting the presence of the first object;
   (d) the image acquisition device physically detecting absence of the first object after detecting presence of the first object;
   (e) the image acquisition device discontinuing storage of the image data corresponding to the first object in response to the image acquisition device detecting the absence of the first object;
   wherein an amount of the stored image data substantially corresponds to a size of the first object;

the image acquisition device initiating a counter of scan lines in response to the image acquisition device detecting the presence of the first object;

the image acquisition device terminating the counter of the scan lines in response to the image acquisition device detecting an absence of the first object;

the image acquisition device recording a final value of the counter after said terminating of the counter.

2. The method of claim 1, further comprising:

the image acquisition device rearming after the image acquisition device detects the absence of the first object, after the image acquisition device discontinues storage of the image data corresponding to the first object, and after the image acquisition device records the final value of the counter;

wherein the image acquisition device acquires more image data for a second object after said rearming and in response to detecting presence of the second object.

3. The method of claim 2, wherein the image acquisition system further comprises an object detector configured to provide a signal indicating the presence and absence of objects including the first object to the image acquisition device, wherein said rearming comprises:

resetting the counter; and initializing a pointer to an on-board image buffer on the image acquisition device.

4. The method of claim 3, further comprising the image acquisition device transferring the image data to a system memory image buffer in a memory of a computer system.

5. A system for acquiring images of variable sized objects, the system comprising:

an image sensing device, wherein the objects are moving relative to the image sensing device;

an object detector for detecting a presence and absence of the objects including a first object, wherein the object detector detects the presence and absence of the objects by transmission of at least one of electromagnetic energy or acoustic energy;

an image acquisition device coupled to the image sensing device and the object detector, wherein the image acquisition device comprises an on-board memory;

wherein the image sensing device generates image data corresponding to the first object, wherein the image acquisition device initiates storage of the image data corresponding to the first object into the on-board in response to the object detector detecting the presence of the first object, wherein the image acquisition device discontinues storage of the image data corresponding to the first object in response to the object detector detecting absence of the first object; and wherein an amount of the stored image data substantially corresponds to a size of the first object;

wherein the image acquisition device further comprises a counter for counting a number of scan lines corresponding to the first object, wherein the image acquisition device is configured (a) to start the counter in response to the object detector detecting the presence of the first object, and (b) to terminate the counter in response to the object detector detecting the absence of the first object;

wherein the image acquisition device records a final value of the counter after the counter terminates counting.

6. The system of claim 5, wherein the image acquisition device is further configured to rearm for acquisition of a second object after the image acquisition device discontinues storage of the image data corresponding to the first object, and after the image acquisition device records the final value of the counter;

wherein the image acquisition device acquires more image data for the second object after said rearming and in response to detecting presence of the second object.

7. The system of claim 6, wherein the image acquisition device is configured to rearm for acquisition of the second object by resetting the counter, and initializing a pointer to an on-board image buffer on the image acquisition device.

* * * * *